June 10, 1958     P. W. ROHRBERG     2,838,328
METALLIC SEALING RING
Filed July 18, 1956

INVENTOR
Paul W. Rohrberg
BY
ATTORNEYS

United States Patent Office 2,838,328
Patented June 10, 1958

2,838,328
METALLIC SEALING RING

Paul W. Rohrberg, Watertown, N. Y., assignor to The New York Air Brake Company, a corporation of New Jersey Application July 18, 1956, Serial No. 598,624

6 Claims. (Cl. 288—14)

This invention relates to packed or sealed joints in general, and more particularly to rod or shaft joints which are effective against substantial hydraulic pressures at temperatures which may range upward from 500° F. to 750° F. or even higher.

The invention provides an elastic all-metal sealing component which can be used in either of two relations, that is to say, a relation in which there is face type sealing between two spaced flat surfaces, and a relation in which there is circumferential sealing, that is to say, sealing between two spaced coaxial cylindrical surfaces.

Of course, the ring has to be dimensioned to fit between the surfaces which are to be sealed but a single ring can be used in either of the two relations above specified. An important feature of the invention is that the ring can be so designed with reference to the surfaces to be sealed by it, that the ring is protected against stressing beyond its elastic limit. The effect is to minimize damage to the seal component during assembly and to permit successful re-use of the seal in nearly all cases.

The seal is a substantially circular seamless metal tube of special cross-section. The cross-section of the tube throughout the circumference of the ring is elliptoid, that is to say an ellipse or approximately an ellipse. The major axis of each elliptoid section is an element of an imaginary right circular cone coaxial with the ring.

The invention can now be described by reference to the accompanying drawing in which.

The drawings are diagrammatic, and the twist imposed on the ring is exaggerated in the interest of a ready perception of the principle.

Where the ring is mounted in an annular recess in the of two sealed components, it is possible to have the ring have two circular line contacts with one of said components (one exercising a centering effect) and a single line contact with the other component.

Figure 1:
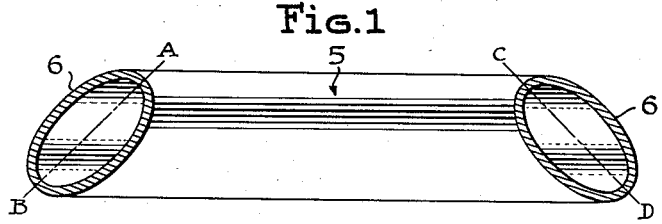
Fig. 1 is a diametric section of a complete ring in its unstressed condition.

In Fig. 1 the ring is shown free of stress. The ring as a whole is indicated by the numeral 5 and is formed of seamless tubing, characterized by a high modulus of elasticity. The mechanics of the concept could be satisfied by any rigid elastic material, but as a practical matter, high temperature virtually requires the use of metal.

The cross-section of the ring is shown at 6 as elliptical, but an oval is an approximate equivalent for an ellipse in this relation and the term elliptoid will be used as inclusive. A circular cross-section will not serve, because, as will appear, displacement of the zones of contact from both major and minor axes is critical as to performance. A circular cross-section does not permit this, aside from the absence of such axes from a circle.

Figure 2:
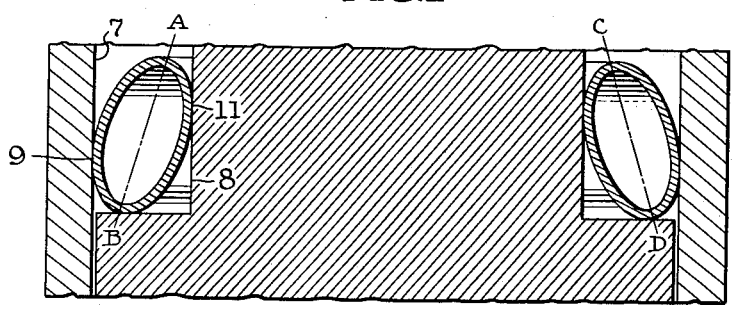
Fig. 2 shows the seal ring under what will be called "circumferential squeeze," that is to say, the ring seals between two spaced concentric substantially cylindrical surfaces each of which is engaged by the ring in such a way as to stress the ring uniformly.
Figure 3:
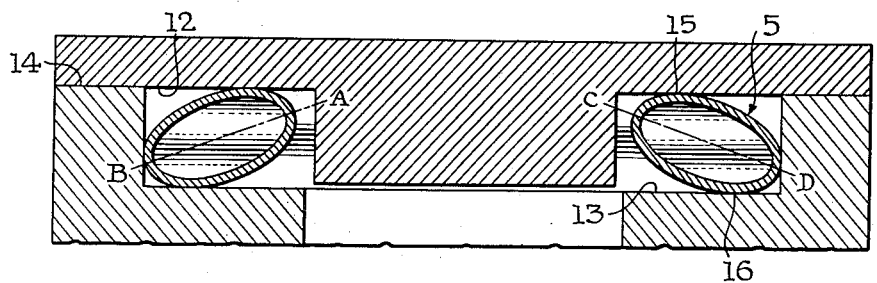
Fig. 3 is a sectional view showing the ring as used in a face type joint. Here again, the ring is uniformly stressed, but the direction of annular twist imposed on the ring is the reverse (in direction) of that characteristic of Fig. 2.

The ring above described is versatile as indicated in Figs. 2 and 3.

In Fig. 2 the ring 5 is shown inserted between an encircling cylindric surface 7 and an encircled cylindric surface 8. These surfaces are so spaced that the major axes AB and CD are displaced from their normal converging relation toward (but not to) parallelism. Compare Figs. 1 and 2.

This puts a twist in the ring 5 throughout its perimeter and develops two annular zones of contact 9 and 11 which effect sealing of ring 5 with surfaces 7 and 8. Surfaces 7 and 8 may be parts of any two components which are to be sealed against leakage through the interval between them.

Fig. 3 shows the same ring 5 between two surfaces 12 and 13 on components which are to be sealed together. These surfaces are shown as planes but could be slightly conical. Plane parallel surfaces are deemed simplest and best. Some means, to limit the approach of surfaces 12 and 13, as for example the shoulder 14, is desirable. As in the arrangement of Fig. 3, there are two annular zones of sealing contact 15 and 16.

It is hardly necessary to say that the parts which carry surfaces 7 and 8 and the parts which carry surfaces 12 and 13 are connected together by conventional means, not shown. Such details are familiar in the art, may vary widely and are not shown because not a feature of novelty.

Thus far the discussion has been on the basis of a single ring, such as is shown in Fig. 1, capable of use in either of the two relations shown respectively in Figs. 2 and 3. Such interchangeable use is interesting as a possibility. It is not however a matter of necessity, and may prove undesirable.

To favor the possibility of interchangeability, the angle DBA is shown in Fig. 1 as 45°, but it is anticipated that distinct forms may prove better for use according to Fig. 2 and for use according to Fig. 3. For use according to Fig. 2 the angle DBA for the unstressed ring might exceed 45° whereas for use according to Fig. 3 it could be materially less than 45°. At least three variables are significant; the physical properties of the material used for the rings, the fluid pressure to which the seal is subjected, and the nature of the loading. Compare for example the loading in Fig. 2 with that characteristic of Fig. 3.

Liquid-filled rings of circular cross-section have been proposed. Liquid filling would not change materially the operative characteristics of applicant's ring, except as protection against collapse. As a known expedient its use is not excluded.

Hollow ring sealing members, circular in cross-section, have been used in the prior art in face type joints. They are satisfactory within limits; but they lack the characteristic of putting a twist in the ring, and so are deficient in elastic follow-up. As a consequence they are easily over-stressed to destruction in making up a joint and they seldom can be re-used satisfactorily.

The rings of the present invention are not circular in cross-section, and they seal on annular areas which in every case are displaced from the minor axis and from the major axis of the elliptoid ring. Many arrangements availing of the advantages above described in detail are possible within the scope of the invention and the claims.

What is claimed is:

1. An elastic sealing component comprising a hollow tubular approximately circular ring of highly elastic metal, the cross-sections of the tubular ring taken on planes radial to the ring being elliptoid with the major axis lying substantially in an imaginary right circular cone coaxial with the ring.

2. The combination of a sealing ring, as defined in claim 1, and means affording two uniformly spaced surfaces between which the sealing ring is confined and with each of which the sealing ring has at least one annular area of sealing contact, said annular areas being spaced and offset substantially uniformly relatively to each other whereby a substantially uniform twisting moment is imposed on the ring throughout its perimeter.

3. The combination defined in claim 2 in which the annular areas of contact lie in spaced substantially parallel planes and the force reactions on the ring are at least approximately parallel with the axis of the ring.

4. The combination defined in claim 2 in which the spaced surfaces are coaxial cylinders, one encircling and the other encircled by the ring, and the force reactions on the ring are substantially radial to the ring.

5. The combination defined in claim 2 in which said annular areas of sealing contact are each displaced from both the major and the minor axes.

6. The combination of a sealing ring as defined in claim 1, and means affording two uniformly spaced opposed surfaces between which said ring is confined and with each of which said ring has an annular area of sealing contact, each said annular area being displaced from both the major and the minor axes of said elliptoid cross sections.

References Cited in the file of this patent

UNITED STATES PATENTS

| 685,610 | Huhn | Oct. 29, 1901 |
| 1,825,962 | Laird | Oct. 6, 1931 |

FOREIGN PATENTS

| 538,517 | Great Britain | Aug. 7, 1941 |